(12) United States Patent
Maziak et al.

(10) Patent No.: US 8,493,210 B2
(45) Date of Patent: Jul. 23, 2013

(54) COMPUTER MONITORING AND REPORTING INFRASTRUCTURE

(75) Inventors: Adrian A. Maziak, Sammamish, WA (US); Alp U. Onalan, Bellevue, WA (US); Mehmet Demir, Redmond, WA (US); Sameer Motwani, Redmond, WA (US); Cloud Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/721,572

(22) Filed: Mar. 11, 2010

(65) Prior Publication Data

US 2011/0221592 A1    Sep. 15, 2011

(51) Int. Cl.
    *G08B 21/00*    (2006.01)
(52) U.S. Cl.
    USPC .............. 340/540; 340/691.3; 340/691.6; 709/201; 709/202; 709/203
(58) Field of Classification Search
    USPC ............ 340/540, 691.3, 691.6; 709/201–203
    See application file for complete search history.

(56) References Cited

U.S. PATENT DOCUMENTS

| 6,754,664 | B1 | 6/2004 | Bush |
| 7,376,969 | B1 | 5/2008 | Njemanze et al. |
| 7,437,763 | B2 | 10/2008 | Guo |
| 2005/0183143 | A1 | 8/2005 | Anderholm et al. |
| 2006/0259604 | A1* | 11/2006 | Kotchavi et al. ............... 709/223 |
| 2009/0055465 | A1 | 2/2009 | DePue et al. |
| 2010/0102982 | A1* | 4/2010 | Hoveida ..................... 340/691.3 |

OTHER PUBLICATIONS

"Event Monitoring, Management and Archiving Made Easy" Retrieved at <<http://www.gfi.com/eventsmanager/?adv=142 &loc=6>>, retrieved date: Dec. 16, 2009, pp. 2.
Toombs, Douglas, "Web Monitoring Solutions", Retrieved at <<http://windowsitpro.com/Windows/Articles/ArticleID/38276/pg/3/3.html>> Edition of Windows IT Pro, Apr. 2003, pp. 2.
"Spector Pro Computer Monitoring Software" Retrieved at <<http://www.netbus.org/computer-monitoring.html>> retrieved date Dec. 16, 2009, pp. 2.

* cited by examiner

*Primary Examiner* — Tai T Nguyen
*Assistant Examiner* — Ojiako Nwugo
(74) *Attorney, Agent, or Firm* — Michael B Dodd; Dodd Law Group, LLC

(57) ABSTRACT

A computer health monitoring server may distribute several alerts to client devices within a network. The client devices may filter the alerts to identify alerts that apply to the client device, based on the hardware and software configuration of the device. The alerts may monitor various items and collect data defined in the alerts. A local user interface may display the alerts and any results from the alerts, and the results may be transmitted to the server. Some users having network privileges may be able to view local alerts as well as alerts from other devices in the network. Other users may be only able to view a subset of alerts. The alerts may be defined with repair processes so that a user may launch a repair activity or, in some cases, the repairs may be performed automatically as defined in the alerts.

20 Claims, 4 Drawing Sheets

COMPUTER MONITORING AND REPORTING INFRASTRUCTURE

BACKGROUND

Computer 'health' is a general concept of a device's ability to perform its tasks. Many different things can adversely affect computer health, such as limited storage space, applications that crash, malware, or other items.

Computer health is generally affected by two different types of people in a network environment. An administrator may configure the computer in certain ways to improve computer health, such as installing firewalls or malware protections. Additionally, a user may affect computer health by how the user interacts with the device, such as installing certain applications, loading up the storage devices, or other actions.

SUMMARY

A computer health monitoring server may distribute several alerts to client devices within a network. The client devices may filter the alerts to identify alerts that apply to the client device, based on the hardware and software configuration of the device. The alerts may monitor various items and collect data defined in the alerts. A local user interface may display the alerts and any results from the alerts, and the results may be transmitted to the server. Some users having network privileges may be able to view local alerts as well as alerts from other devices in the network. Other users may be only able to view a subset of alerts. The alerts may be defined with repair processes so that a user may launch a repair activity or, in some cases, the repairs may be performed automatically as defined in the alerts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
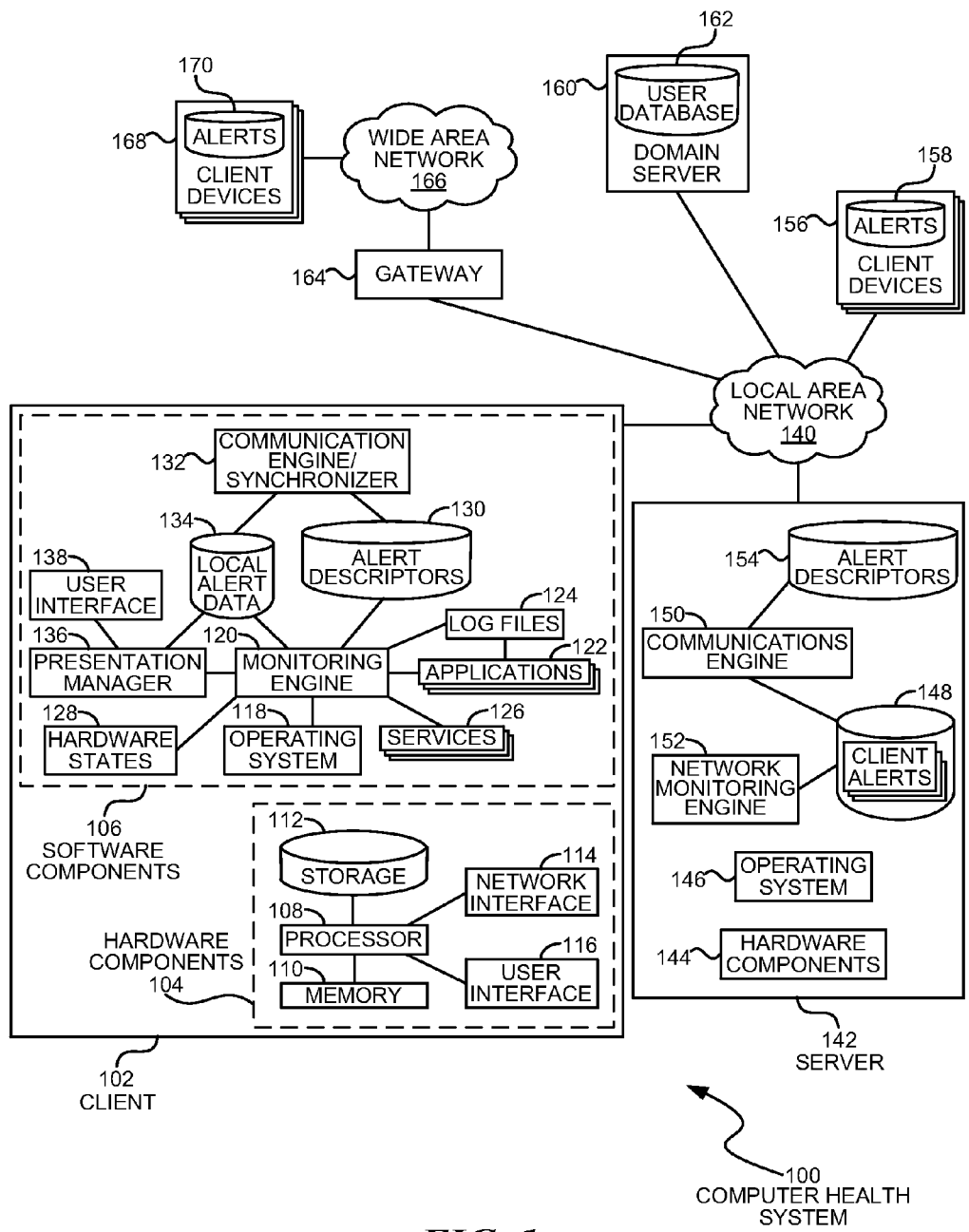
FIG. 1 is a diagram illustration of an embodiment showing a network environment in which an alert-based health monitoring system may operate.

A computer health monitoring system may have a set of alerts that are distributed to various computers. The alerts may identify conditions that may be reported, and may also include repair procedures for correcting the identified condition. The status of the alerts may be transmitted to a server, which may distribute the status to those users who may have permission to access the alerts.

The alerts may be individual indicators that make up a computer's health. In some embodiments, the results of various alerts may be grouped together and used as a metric of the health of various subsystems or functions of a computer, as well as rolling up into an overall health assessment of the computer.

The alerts may include automated repair procedures in some cases. The alert may be defined with a condition that detects the alert, plus a procedure for correcting the condition. In some cases, the repair may be automatically performed when the condition is detected, while in other cases, the repair may be presented as an option to a user, and then performed after the user selects the repair option.

The alerts may include event driven alerts and interval alerts. An event driven alert may be launched in response to detecting an event in the operating system or an application executing on a device. An interval alert may be an action that is performed on the device on a regular basis. For example, an event driven alert may be fired when a backup system is launched and the alert may monitor and report the success or failure of the backup system. The same type of alert may be implemented in a nightly status check that determines if the backup has performed and whether or not it was successful.

A user interface on the various client devices may display local alerts and, in some cases, alerts from other devices. The specific alerts that a user sees may be based on the user's permissions. In some cases, a user may be only permitted to view a subset of alerts for the user's device. In other cases, a user may be permitted to view all alerts, including alerts generated on another device.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system in which the computer health of various clients is monitored. Embodiment 100 is a simplified example of a system that may use downloaded alert descriptors to identify various issues with a client device, and to display the local alerts and remote alerts on a local user interface.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a simplified network environment in which an alert system may be used to monitor computer health. Each client within the network may download alert descriptors from a server and use those descriptors to monitor various aspects of the client device. When a condition is encountered, an 'alert' may be generated. The 'alert' may include alert data that may be stored in a local data store and copied to a server, where the server may store the alert data for all clients in the network.

A user interface may be generated showing the alert data for both the local alerts and some or all of the remote alerts stored on the server. The alert data viewable by a user may depend on the user's credentials and the permissions associated with the credentials.

In some cases, the alert descriptors may include a repair action. The repair action may be a script or other executable that may cause the alert's condition to be fixed or repaired. Repair actions may be presented in a user interface as an option that the user may select and cause to execute.

The health of a computer may be defined by many detectable parameters, The parameters may be grouped together to determine the health of computer subsystems, such as storage, network access, or security, as well as various applications that may be executing on the device or accessed by the device over a network connection. The summary of all the groups of parameters may indicate the overall health of the device. The parameters may be identified by alerts detected throughout the system.

New hardware or software components may introduce new health parameters to a device. The new health parameters may be applied to the device when those changes are detected and when updates to the alert descriptors are distributed to client devices.

The alert descriptors may be extensible by third parties, such as third parties that manufacture hardware or software components that may be used by a client device. In some cases, a hardware Original Equipment Manufacturer (OEM) may create a set of alert descriptors that detect special parameters for specific devices, or may create a set of alert descriptors that have conditions or values that are specific to the devices.

The alert descriptors may include a detection definition that may determine how a parameter or condition is to be detected. In some cases, the detection definition may be a script or other interpreted command that can be executed by a general purpose operating system shell. In other cases, the detection definition may be a compiled executable command that can be executed by the client device or by another device available across a network.

A user interface may display local alerts as well as remote alerts. Local alerts may refer to alert data that pertain to the local device and may be stored in a local data store. Remote alerts may refer to alert data that pertain to other devices and are stored on a data store on a remote server.

If a network connection is disconnected, the user interface may continue to function by displaying alert data from the local data store. This may allow a user to monitor and repair problems on a local client device without having to be connected to the network. Such a feature may be useful for devices that are frequently removed from the network, such as a laptop computer that a user may remove from the network and take to their home, a coffee shop, airport, or other locations outside of the local area network. When the device is reconnected to the network the alert data may be synchronized with the server.

The communications between the client and server may be performed by a communication service that performs a synchronization operation between the two devices. Some synchronization systems may allow changes to data on both the client and server side to be reconciled when the synchronization is performed.

The synchronization system may, in some embodiments, also be used to synchronize an updated version of alert descriptors between the server and clients. In other embodiments, the alert descriptors may be downloaded to the clients by a push or pull mechanism. In a push mechanism, the server may initiate a transfer from the server to the client, whereas in the pull mechanism, the client may initiate the transfer.

Embodiment 100 shows a client 102, which may be any type of device connected to a network. The client 102 is illustrated as a device that may be a conventional computer device, with a set of hardware components 104 and software components 106.

In a typical embodiment, the client 102 may be a desktop or server computer. The client 102 may also be a laptop computer, netbook computer, or other portable device such as a cellular telephone, portable scanner device, personal digital assistant, or any other device. In some cases, the client 102 may be a game console, network router, network appliance, or other device.

The hardware components 104 may include a processor 108, random access memory 110, and nonvolatile storage 112. The hardware components 104 may also include a network interface 114 and user interface 116.

The software components 106 may include an operating system 118 on which a monitoring engine 120 may execute. The monitoring engine 120 may monitor conditions within the operating system 118 as well as various applications 122 and services 126. In some cases, the monitoring engine 120 may be capable of reading application log files 124 as well as configuration files and other sources of information.

The monitoring engine 120 may consume a set of alert descriptors 130 to determine what parameters to check and how to check them. In some embodiments, the alert descriptors 130 may include instructions or mechanisms for determining parameter values for each alert. The instructions may be performed by the monitoring engine 120. In some cases, the instructions may be executable code that the monitoring engine 120 may launch and other software components, such as a scripting shell or managed code engine, may operate.

The monitoring engine 120 may interact with various applications 122 by performing queries or interacting with the applications 122 directly. In some cases, the monitoring engine 120 may read various files or data created by or consumed by the applications 122 in the form of log files 124, configuration files, or databases. Similarly, the monitoring engine 120 may interact with various services 126 to determine the status of the services, perform queries to determine operational parameters, or other interaction.

In some cases, the monitoring engine 120 may identify parameters about the applications 122 and services 126 through indirect mechanisms. For example, the monitoring engine 120 may perform a query to an application 122 to determine whether a service 126 used by that application is functioning or not. The result may be a parameter used to determine the status of the service 126 even though the monitoring engine 120 may not directly query or interact with the service 126.

The monitoring engine 120 may gather parameters from the operating system 118 and may, in some cases, perform queries to various hardware states 128 that may be exposed by hardware components.

The alert descriptors 130 may be loaded onto the client 102 by a communication engine 132. The communication engine 132 may communicate with a server 142 to receive the alert descriptors 130 as well as upload the local alert data 134 created by the monitoring engine 120.

In some embodiments, the communication engine 132 may synchronize data between the client 102 and the server 142. Synchronization systems may operate by ensuring changes to data on one device are reflected on data stored on another device. In many cases, synchronization systems may resolve differences to changes made on both the client and server in order to maintain the same data on both devices.

When a synchronization system is employed, the local alert data 134 may be continually synchronized with data stored on the server 142. When the local alert data 134 are updated or changed, the synchronization system may cause the updated data to be transmitted to the server 142. Similarly, a change to the alert descriptions 130 by either the client 102 or the server 142 may cause the changes to be propagated to the other device. For example, a new application may be installed on the client 102. As part of the installation process, the alert descriptors 130 may be amended to include several new alerts. The synchronization system may cause the updates to be propagated to the server 142, and similar synchronization systems may cause the same updates to propagate from the server 142 to other client devices 156.

The alert descriptors 130 may include a filter description. The filter description may be a mechanism for identifying alert descriptors that apply to specific hardware and software configurations. In such an embodiment, the alert descriptors 130 may include a very large set of alert descriptors and the filter description may allow the monitoring engine 120 to determine which alerts to use. Such an embodiment allows the same set of alert descriptors 130 to be distributed to every client device, regardless of the hardware and software configuration of the client device.

Other embodiments may operate by having only subset of alert descriptions stored on the client 102. The subset may be only those alert descriptors that apply to that particular hardware and software configuration of the client device. In such embodiments, a descriptor of the hardware and software configuration may be transmitted to the server 142 and the server 142 may send the applicable alert descriptors to the client 102.

The monitoring engine 120 may populate a local data store with local alert data 134. The local alert data 134 may be any parameters, conditions, or other information that may be generated when an alert is processed. Many alerts may generate an alert level, which may reflect the urgency of the alert or a general status, such as 'good' or 'bad', for example.

The health of the client 102 may be reflected by rolling up the various alert statues. In some embodiments, the health of individual subsystems or functions of the client 102 may be determined by several alert statuses, and the health of the subsystems or functions may be aggregated to determine a health of the overall system.

Some alerts may generate alert status and alert data each time the alert is processed, regardless of the alert status. When a status is normal or 'good', the alert may produce alert data that reflects the status. Other alerts may only produce local alert data when the status is something other than 'good'. Such alerts may only produce local alert data when the status is 'warning' or 'bad', for example.

A presentation manager 136 may populate a user interface 138 with alert information. The user interface may be any type of user interface device, such as a window on a computer desktop, an icon in a dashboard, a gadget or widget that displays current status, or any other type of user interface mechanism. In some cases, the user interface may be a command line console.

The presentation manager 136 may populate the user interface 138 with a subset of the local alert data 134. The subset may be determined by the user credentials of the user who may be logged into the client 102.

In some cases, the user of the client 102 may not see certain alerts. For example, a parent may not want a child to see an alert that a network gateway is not filtering web content. However, the parent may wish to see such an alert so that precautionary measures may be taken.

The presentation manager 136 may gather alert data from remote sources, which may come from the server 142. The remote alert data may be alert data created by other devices, including other client devices 156 and server devices. The remote alert data may be presented on the user interface 138 when the user of the client 102 has the appropriate authenticated credentials.

In some embodiments, a user's credentials may be verified by a domain server 160. The domain server 160 may have a user database 162 that contains entries for users within the domain and each user may be assigned membership into various groups. Based on the group membership, the presentation manager 136 may make certain information available to certain users and may prohibit some data from being viewed by other users.

The remote alert data presented on the user interface 138 may be filtered by a user's permission settings. For example, a network may be configured where each user is assigned their own device for which they may have administrator privileges. A user on their own device may have permission to view all of the alerts on their device, but may have limited or no permission to view alerts on other devices. A user on someone else's device may have limited or no access to alerts on the other person's device, but may be able to see any alerts generated on their home device.

The permission settings may affect how the alert data may be displayed. In some cases, certain permission settings may permit a reduced subset of the alert data to be displayed or to be displayed in one format, while another user's permissions may permit an expanded format with additional information and options. For example, some permission settings may permit a repair option to be presented to a user, while other permission settings may not.

A repair option may be a mechanism to change a setting related to an alert. The repair may be a script or other executable code that corrects, fixes, resets, or otherwise changes the underlying cause of an alert. In some cases, the repair may be a remedial action, such as restart a service. In other cases, the repair may reformat a database, update an application, run a set of checks against a database, or perform other complex actions. In some cases, the repair operation may operate without user interaction, while in other cases, a user may be prompted for information during the execution of the repair.

Some embodiments may include automatic repair operations. An automatic repair operation may be launched by the monitoring engine 120 when a certain condition is performed without a user interaction or approval.

The client 102 may communicate with a server 142 across a local area network 140. The server 142 may manage the alerts from the client 102 as well as several other client devices 156. Each of the clients may be a different hardware and software configuration, but may generate alert data that can be centrally stored by the server 142 and accessed by the various clients.

The client devices 156 are represented showing only the alerts 158. The client devices 156 may also contain some or all of the various other components of the health monitoring system as illustrated for the client 102.

The server 142 may be any type of computing device. In a typical embodiment, the server 142 may be a server computer with hardware components 144 similar to the hardware components 104 of the client 102. The server 142 may have an operating system 146 as well as several software components that operate on the operating system 146.

A data store may contain the client alerts 148 generated by the client 102 as well as the alerts 158 from client devices 156. A communications engine 150 may work in conjunction with the client communication engines, such as communication engine 132 on client 102. The communications engine 150 may also transmit the alert descriptors 154 to the various clients.

A network monitoring engine 152 may monitor various network specific alerts in a similar manner as the client monitoring engine 120. The network monitoring engine 152 may perform various queries, performance monitoring, or other functions against any infrastructure devices for the local area network 140 as well as any gateway devices 164 that may connect to a wide area network 166, such as the Internet. The network monitoring engine 152 may process various network alerts and add the network alert data to the data store along with the client alerts 148.

In some embodiments, some client devices 168 may reside outside the local area network 140. Such client devices 168 may generate various alerts 170. In some cases, the client devices 168 may connect to the sever 142 on the local area network 140 and transmit the alerts 170 to the server 142 as well as receive updates of the alert descriptors 154.

Figure 2:
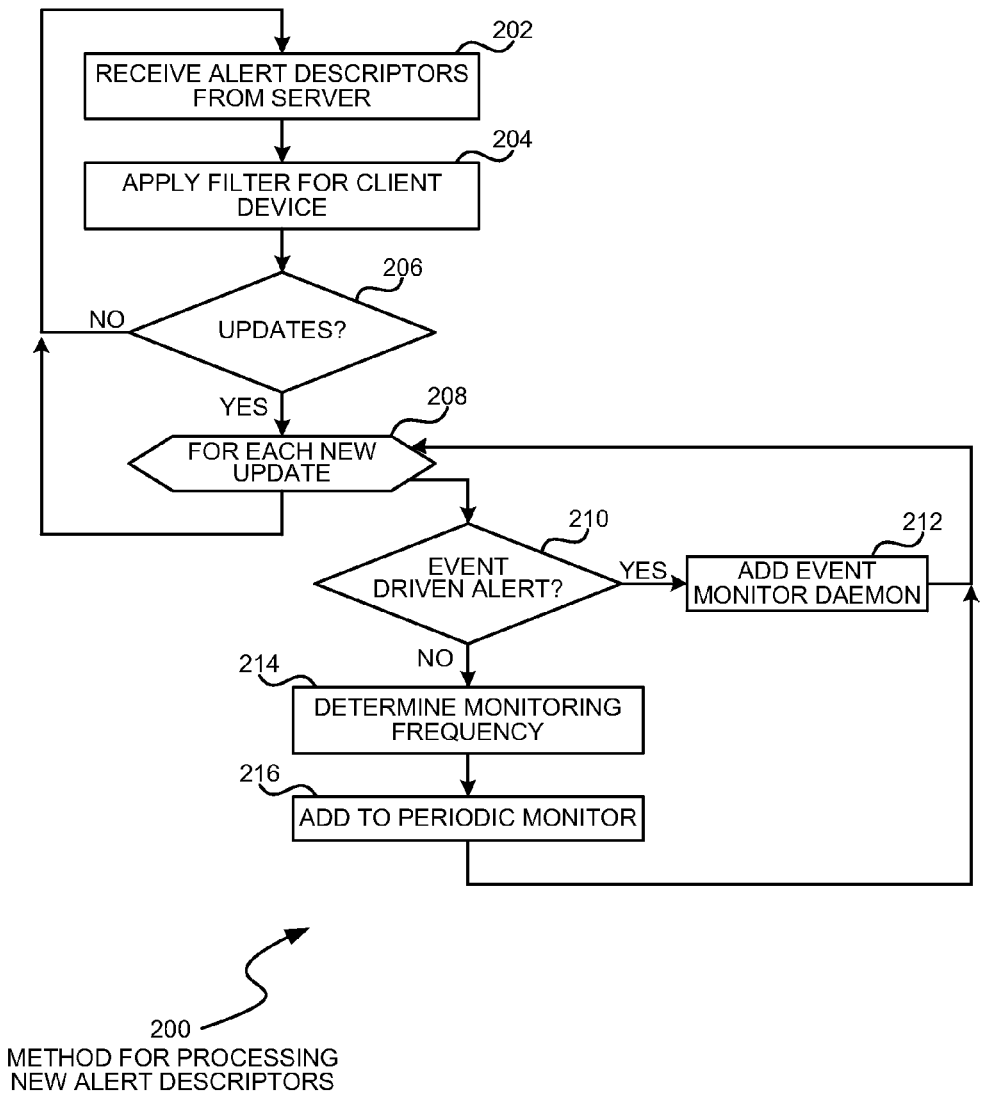
FIG. 2 is a flowchart illustration of an embodiment showing a method for processing new alert descriptors.

FIG. 2 is a flowchart illustration of an embodiment 200 showing a method for processing new alert descriptors. Embodiment 200 is a simplified example of a process that may be performed by a monitoring engine, such as monitoring engine 120, when an update to a set of alert descriptors is received.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates one method by which an updated set of alert descriptors may be handled. The alert descriptors may be received by a device, filtered, and installed for operation. Embodiment 200 illustrates a method that may be performed when a superset of alert descriptors are received by a client device. A superset of alert descriptors may include all of the alerts that may be used within a network environment as managed by an alert server. Such an embodiment allows a single set of alert descriptors to be propagated across all of the various clients and the client may select those alerts applicable to the client's configuration.

The alert descriptors may be received by a client device from a server in block 202. In many cases, a single server may supply alert descriptors as well as maintain a database of alert data from multiple client devices. In other cases, the alert descriptors may be transmitted to a client device from a different server than the server that stores the alert data.

After receiving the alert descriptors in block 202, a filter may be applied in block 204. The filter may identify those alert descriptors that may be applicable to the local client device.

The filter of block 204 may be included in the alert descriptors. Some embodiments may include the alert descriptors in the form of an XML file, for example. The XML file may include both alert descriptor definitions as well as filter definitions.

The filter definitions may identify specific alerts or sets of alerts that apply to specific types of hardware or software configurations. Certain hardware platforms may have specific sets of alert definitions that apply to them. For example, a hardware platform may have alerts that call some hardware specific function call or have alerts with specific conditions or settings that apply to the hardware configuration. In another example, the presence of certain software applications, services, or settings may be used to identify alerts that pertain to those software components.

After filtering, if there are not updated alerts in block 206, the process may return to block 202 until another updated set of alert descriptors is received.

If there are updated alerts in block 206, each new update is processed individually in block 208.

If the alert is an event driven alert in block 210, an even monitor daemon may be created in block 212. If the alert is not an event driven alert in block 210, the monitoring frequency may be determined in block 214 and the alert may be added to a periodic monitoring system in block 216.

An event driven alert may be an alert that may be triggered when a specific condition is detected. The condition may be any measurable or detectable condition, and may include when a certain action is performed by a hardware or software component, for example. The event driven alert may only be evaluated or executed when the condition is present.

Another type of alert may be an alert that is periodically monitored. Such an alert may be monitored on a regular basis and may be evaluated at each monitoring interval. For example, an alert may be configured for a backup service that may operate every evening. A periodically monitored alert for the backup service may check the backup service every morning to determine if the backup was successful. If so, alert data may be generated stating that the backup was successful.

In another example, the backup service of the previous example may be monitored using an event driven alert. In such an example, the event driven alert may be triggered to launch when the backup system throws an error. If the backup system does not throw an error, the even driven alert may not be evaluated and no alert data generated for the alert.

Periodically monitored alerts may be configured so that a process in a monitoring engine may evaluate the parameters defined in the alert descriptors and generate corresponding alert data. In some cases, an alert may not generate alert data in one set of conditions. Other alerts may generate alert data in all sets of conditions, with the alert data changing with the conditions.

Once the new or updated alerts are processed in block 208, the process may return to block 202 to await any new updates.

Figure 3:
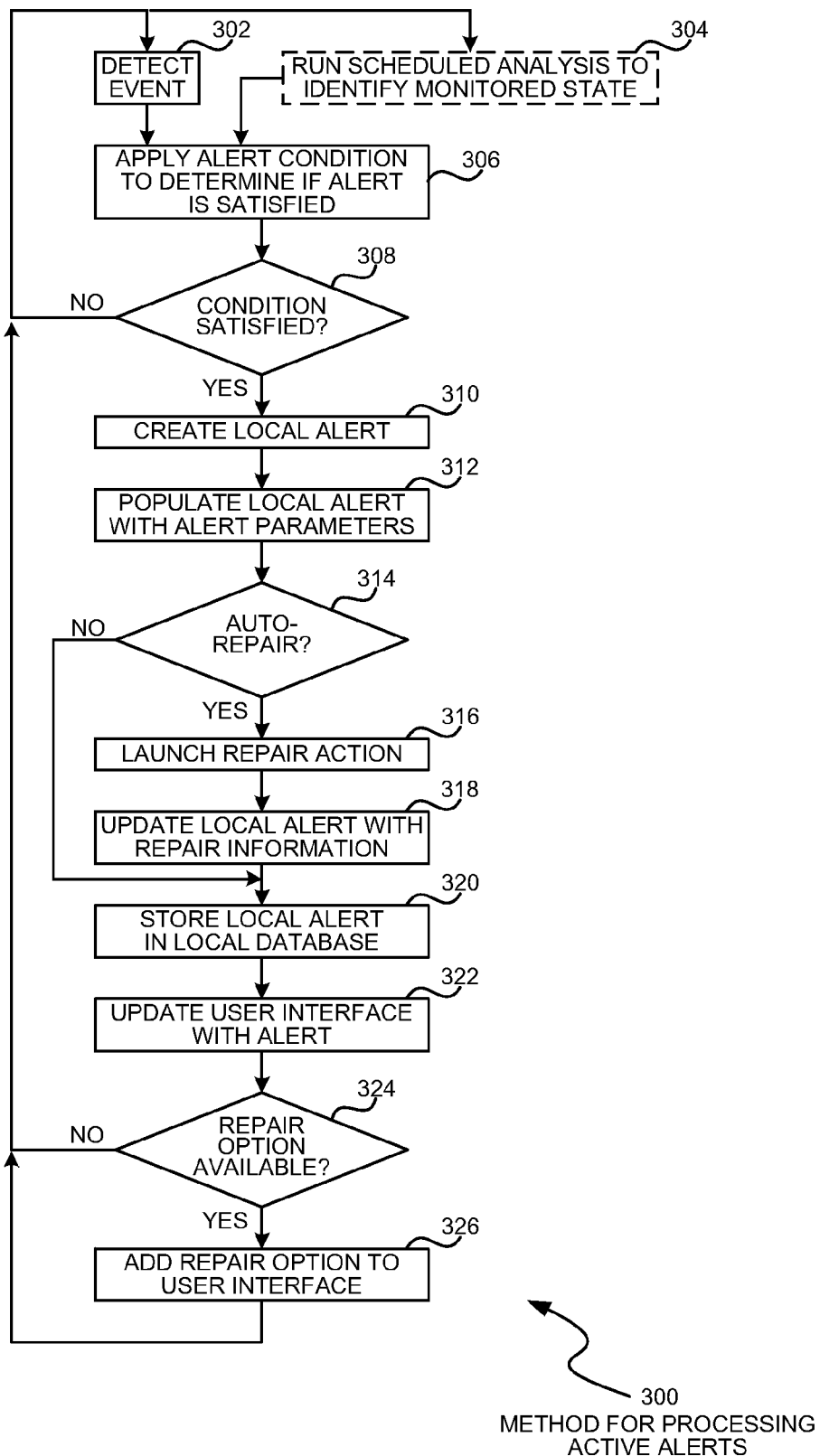
FIG. 3 is a flowchart illustration of an embodiment showing a method for processing active alerts.

FIG. 3 is a flowchart illustration of an embodiment 300 showing a method for processing alerts. Embodiment 300 is a simplified example of a process that may be performed by a monitoring engine, such as monitoring engine 120, when an alert condition has been met.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a general method for handling alerts, both event driven alerts and regularly monitored alerts. Once the conditions of the alert are met, the alert data may be generated, any repairs performed, and the alert data stored in both the local alert database and a remote or server database. The process of embodiment 300 illustrates the actions that may be performed for a single alert.

An event may be detected in block 302 for an event driven alert. For monitored alerts, a scheduled analysis may be run in block 304 to identify monitored states.

In block 306, the alert condition may be applied to determine if the alert is satisfied. The alert condition may be defined in the alert descriptors and specify certain conditions which may trigger the alert. If those conditions are not satisfied in block 308, the process may return to blocks 302 or 304 as appropriate.

If the conditions for the alert are satisfied in block 308, a local alert may be created in block 310, and the local alert may be populated with alert parameters in block 312. An alert descriptor may include various parameters that may be gathered in response to the alert. In some cases, the parameters may be the conditions that were met in block 308, but in other cases additional parameters or data may be collected in block 312.

Some alerts may have repair definitions associated with the alert. The repair definitions may include scripts or other mechanisms that may correct an underlying problem that generated the alert.

In some alerts, the repair definitions may be configured to be automatically executed in block 314. If so, the repair action may be launched in block 316 and the local alert may be updated in block 318 to include repair information. The repair information may include the success or failure of the repair, among other information. If the repair definition is not configured for automatic execution in block 314, the process may skip blocks 318 and 320.

In block 320, the local alert data may be stored in a local data store, and a local user interface may be updated in block 322 with the new alert data. After the local data store is updated, a communications system may synchronize the local data store with a network data store and transmit the alert data to a server. The alert data may then be propagated to other devices for users who have permission to view the alert data.

Figure 4:
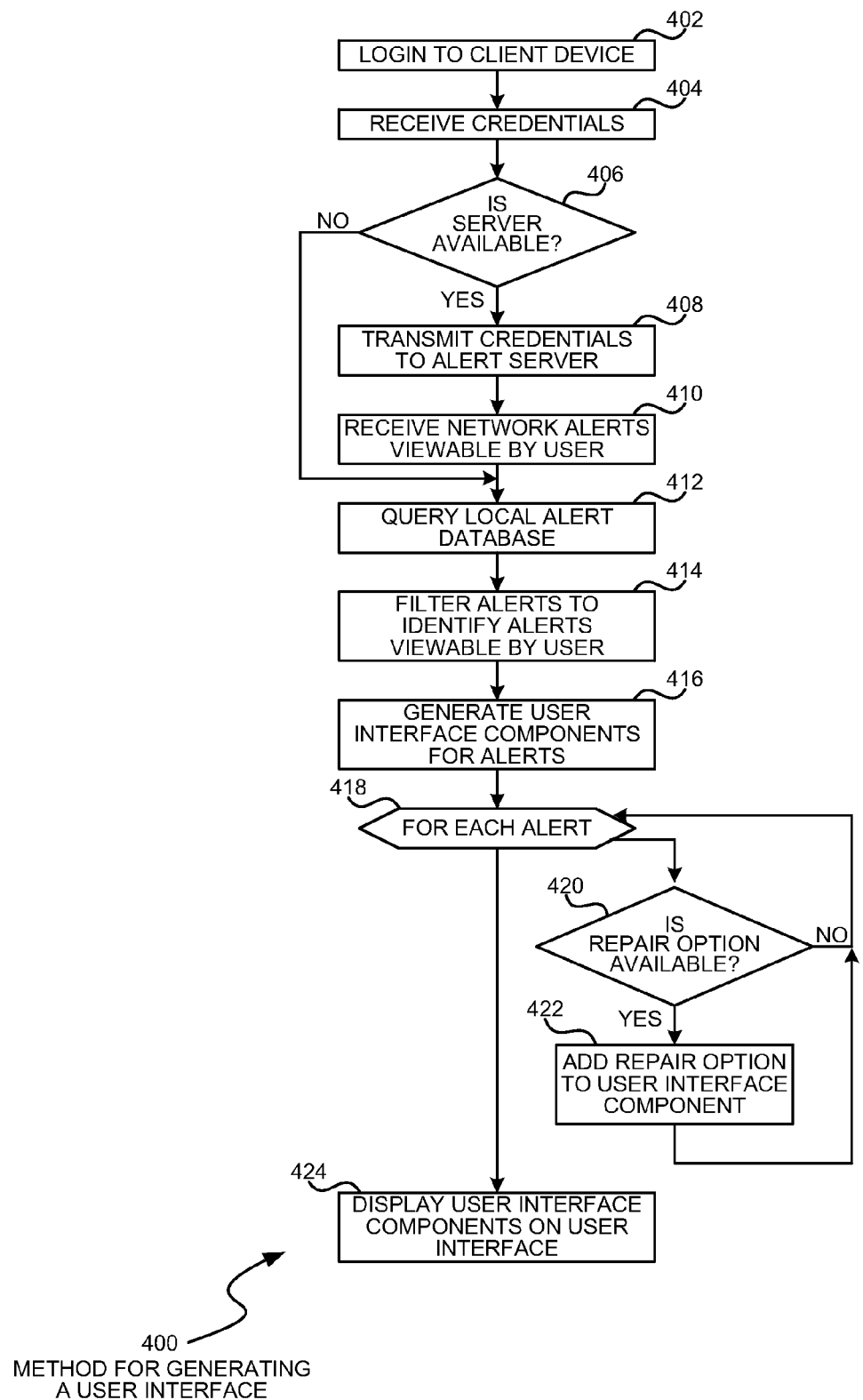
FIG. 4 is a flowchart illustration of an embodiment showing a method for generating a user interface.

FIG. 4 is a flowchart illustration of an embodiment 400 showing a method for generating a user interface on a client device. Embodiment 400 is a simplified example of a process that may be performed by a presentation manager, such as the presentation manager 136 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 represents a process that may be performed when a user logs into a client device. The local alerts for which the user has permission may be displayed on a user interface and any alerts available from an alert server may be added to the user interface.

In block 402, a user may login to a client device and may present credentials in block 404. The credentials in block 404 may be authenticated by a domain server or other authentication mechanism. When the credentials are presented, a set of permissions may be received that may be used to permit or deny access to some or all of the alerts, including local alerts and remote alerts received from the network server.

If the network server is available in block 406, the credentials may be transmitted to the network server in block 408 and networks alerts for which the user has permission to view may be received in block 410.

If the network server is not available in block 406, the process may skip blocks 408 and 410. The absence or unavailability of the network server may still allow the local client device to display any alerts from the local data store.

The local alerts may be queried from the local alert database in block 412. A local data store may contain a database of local alerts and the database may allow various queries to be performed against it.

The local alerts may be filtered in block 414 to identify those alerts that may be viewable by the current user.

Various user interface components may be generated in block 416 for the alerts. In one embodiment, each alert may have a user interface component that defines the alert. The component may include an alert title, detailed description, help information, parameters monitored by the alert, and other information.

For each alert in block 418, if a repair option is available for the alert in block 420, the repair option may be added to the user interface component in block 422.

Once all of the user interface components are generated, the components may be displayed on a user interface in block 424.

The user interface components may be blocks of information that may be used by a presentation manager to create an interactive user interface. The presentation manager may display a summary of an alert with an urgency icon or other indicator. A user may select the icon and expand the display to browse through the various parameters associated with the alert as well as access different options. The options may include displaying more detail, displaying help information, executing a repair operation, or other actions. In some embodiments, the user interface components may be defined using XML or other declarative language and processed by a presentation manager into an interactive graphical user interface.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer health monitoring system client comprising:
    a user interface;
    a communication system that downloads alert descriptors from a server;
    a local data store;
    a local monitoring engine that collects local alert data and stores said local alert data in said local data store, said local alert data being defined in said alert descriptors;
    said communication system further uploading said local alert data to said server; and
    a local presentation manager that:
        gathers said local alert data from said local data store
        gathers network alert data from said server;
        groups said local alert data and said network alert data into a corresponding overall health assessment of a monitored computer system; and
        presents at least a portion of said local alert data and at least a portion of said network alert data along with said overall health assessment on said user interface.

2. The client of claim 1, said alert descriptors further comprising a filter definition, said client further comprising:
    a filter engine that determines a subset of said alert descriptors to apply to said client based on said filter definition.

3. The client of claim 1, said communication system comprising a synchronization system that synchronizes data on said client and said server.

4. The client of claim 1, said client further comprising:
    an authorization engine that receives a user credential and determines a user permission based on said user credential.

5. The client of claim 4, said alert descriptors comprising access indicators based on said user permission, said access indicators being used by said local presentation manager to exclude at least one of said local alert data from said user interface.

6. The client of claim 5, said user permission being further used by said local presentation manager to exclude at least a portion of said network alert data from said user interface.

7. The client of claim 6, said network alert data comprising remote alert data collected by a remote monitoring engine on a second client device.

8. The client of claim 1, said alert descriptors comprising a repair action for a first alert.

9. The client of claim 8, said repair action being an optional action performed after a user interaction.

10. The client of claim 8, wherein a local presentation manager that groups said local alert data and said network alert data into a corresponding overall health assessment and presents at least a portion of said local alert data and at least a portion of said network alert data along with said overall health assessment on said user interface comprises a comprises a local presentation manager that:
    groups one or more subsets of said local alert data and of said network alert data into health metrics for one of more monitored subsystems of said monitored computer system;
    rolls up said health metrics into said overall health assessment; and
    presents one or more of said health metrics along with said overall health assessment on said user interface.

11. At a computer system, a method for monitoring computer system health, the method comprising:
    receiving a set of alert descriptors from a server, each of said alert descriptors comprising:
        an alert name;
        a monitored item; and
        a condition for said monitored item;
    processing said set of alert descriptors within a client device to create a set of local alerts by:
        evaluating said monitored item;
        determining a state for said condition for said monitored item;
        creating a local alert when said condition is met;
        storing said local alert in a local database; and
        transmitting said local alert to said server;
    receiving a set of network alerts from said server;
    grouping said set of local alerts and said set of network alerts into an overall health assessment of a monitored computer system; and
    presenting at least a portion of said local alerts and at least a portion of said network alerts along with said overall health assessment on said user interface.

12. The method of claim 11 further comprising:
    receiving a filter definition from said server; and
    processing said set of alert descriptors by further:
        determining characteristics of said client device;
        using said characteristics with said filter definition to identify a subset of said alert descriptors applicable to said client.

13. The method of claim 11 further comprising:

receiving a permission setting for each of said alert descriptors from said server, said permission setting identifying a class of users capable of viewing each of said local alerts;

identifying a user class for a current user of said client device; and presenting a subset of said local alerts on said user interface based on said user class.

14. The method of claim 13 further comprising:

transmitting a user identifier to said server; and receiving a subset of said network alerts from said server based on said user class.

15. The method of claim 11 further comprising:

for at least one of said local alerts, presenting a repair option on said user interface, said first option being capable of repairing said condition for said local alert.

16. The method of claim 15 further comprising:

for at least one of said network alerts, presenting a second repair option on said user interface, said second repair option being capable of repairing said network alert.

17. The method of claim 11, wherein grouping the set of local alerts and the set of network alerts into an overall health assessment of computer system comprises:

grouping one or more subsets of alerts taken from said set of local alerts and from said set of network alerts into health metrics for one of more subsystems of said monitored computer system; and rolling up said health metrics into said overall health assessment.

18. The method of claim 11 further comprising:

determining that said server is not reachable; and presenting said at least a portion of said local alerts on said user interface without presenting said at least a portion of said network alerts on said user interface.

19. A client device comprising:

a user interface;

a communication system that downloads alert descriptors from a server, said alert descriptors comprising descriptors for local alerts, said descriptors comprising:

an alert name;

a monitored item;

a condition for said monitored item; and a user class capable of viewing said local alert;

a local data store;

a local monitoring engine that processes said alert descriptors by a first method comprising:

evaluating said monitored item;

determining a state for said condition for said monitored item;

creating a local alert when said condition is met;

storing said local alert in a local data store; and transmitting said local alert to said server;

a local presentation manager that performs a second method comprising:

determining a user class for a current user of said client device;

identifying a subset of said local alerts stored in said local data store that said current user is capable of viewing;

connecting to said server and receiving a subset of network alerts available from said server, said subset of network alerts being those network alerts capable of being viewed by said current user; and aggregating said subset of said local alerts and said subset of said network alerts into an overall health assessment of a monitored computer system;

presenting said subset of said local alerts and said subset of said network alerts along with said overall health assessment on said user interface.

20. The client device of claim 19, at least one of said local alert descriptors comprising a repair script;

said second method further comprising presenting a user input mechanism on said user interface, said user input mechanism configured to launch said repair script.

* * * * *